June 20, 1939. B. D. BROWN 2,162,880

PACKAGE AND PART THEREOF

Filed Aug. 27, 1936

INVENTOR
Banks D. Brown
BY
Norman R. Holland
his ATTORNEY

Patented June 20, 1939

2,162,880

UNITED STATES PATENT OFFICE

2,162,880

PACKAGE AND PART THEREOF

Banks D. Brown, Connellsville, Pa., assignor to Capstan Glass Company, Connellsville, Pa., a corporation of Delaware Application August 27, 1936, Serial No. 98,145

5 Claims. (Cl. 215—43)

The present invention relates to means for preventing breakage of molded closure caps during the application thereof to containers.

Considerable difficulty is experienced when applying molded caps to containers in that the caps frequently break. In some instances, fragments of a broken cap fall into the contents of the container, rendering the contents unfit for human consumption, and thus causing complaints on the part of the consumer. Even though such fragments may not fall into the container being sealed, it is necessary to apply a new cap to the container. This slows up the operation of the sealing machine in that any broken cap particles still attached to the neck of a container must be removed and a new cap placed thereon. Also, the cost of the package to the ultimate consumer is increased, since an allowance for such breakage must be made by the packer, including the cost of the cap, which amounts to about one-half a cent, and the cost of the additional labor in removing containers with broken caps and applying new caps.

Frequently, caps develop microscopic cracks during sealing operations which remain undetected by inspection at the plant of the packer. These cracks allow the container contents either to leak or spoil during shipment, which may not be detected until opened by the consumer.

Breakage of molded caps is caused, to a certain extent, by excessive sealing forces applied by operators or by sealing machines, by inherent brittleness of the molded caps and by inherent irregularities present in glass finishes.

Excessive sealing forces may be minimized by making certain adjustments to the sealing machine. Operators, however, are more concerned with a tight seal and the machines are usually adjusted to apply a maximum force. If the caps break, complaints are made to the effect that the caps are unsatisfactory. The inherent brittleness of molded caps varies with different batches of "Bakelite" and is affected, to some extent, by variations in the temperature and period of curing under heat during manufacture. Naturally, the manufacturer attempts to maintain these in conformity with established standards but, nevertheless, there are always slight variations. The variations present in glass finishes are inherent in the manufacture and offer a serious objection from the standpoint of cap breakage, as they cannot be corrected. During cooling the glass contracts, or otherwise changes slightly in shape, so that the finished product varies a few thousandths of an inch from the desired standard. If one thread is slightly lower than another, or is at a slightly different pitch, the strain to which a molded cap is subjected during the sealing operation is greatly increased.

The present invention aims to overcome the above difficulties and to minimize the breakage of molded closure caps by providing a container having serrations or frosted portions on the threads thereof, or by having serrations or frosted portions on both the cap threads and container threads, or by having the serrations on the cap threads alone. This creates an increased friction or resistance to the applying forces effective on the cap during application and prevents the cap from being screwed on so tightly as to cause breakage.

When a closure cap made of a synthetic resin or plastic molding compound and provided with the usual smooth type of screw thread is applied to a container having threads provided with serrations, normal sealing pressures do not affect the cap, since the material of the cap is quite hard, but when the pressures become abnormal, the serrations dig into the cap threads to cause increased resistance to turning. This increased resistance to turning does not occur abruptly but is, in effect, a braking action which increases in approximately geometrical proportion and which occurs before the rupture point of the molded cap is reached. An automatic sealing chuck is thus caused to release before breaking the cap or, if the caps are being applied by hand, the operator feels that a tight seal has been effected and ceases turning the cap downwardly, thus eliminating breakage of the cap. As long as any inherent irregularities of the glass finish are not effective upon the threads of a cap and the pressures are of normal value, the application of the cap may be the same as with the customary container having a smooth thread finish. Where inherent irregularities are present in the container thread, the serrations at such places, upon coming into contact with the cap threads, have no immediate effect and the cap threads continue to ride over the serrations until the pressures at such places become abnormal. When an abnormal value of pressure is reached, the serrations dig into the material of the cap thread and the braking action commences. Regardless of whether or not there are irregularities present on a container thread, as soon as the pressures between the cap threads and the container threads reach an abnormal value, the serrations commence digging into the cap thread to increase the resistance to rotation. The braking action is in direct opposition to the applying force, that is, it acts circumferentially of the container. Without the braking action, there is a vertical or axial component which is several times the applying force due to the leverage or inclined plane action of the thread.

An object of the present invention is to eliminate breakage of molded closure caps during application thereof to containers.

Another object of the invention is to provide a container having means on the neck thereof adapted to cooperate with a closure cap to prevent breakage thereof during application to a container.

Another object of the invention is to provide a container and a closure, each having means thereon adapted to cooperate to prevent breakage of cap during sealing thereof to a container.

A further object of the invention is to provide a closure cap having means on the inside of the skirt thereof adapted to engage with a container during application thereto to prevent breakage of the cap.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein;

Fig. 1a is an enlarged sectional view, taken along contacting edges of the cap and container threads, illustrating the action of the container serrations on a smooth cap thread when the pressures are of normal value;

Fig. 1b is a similar enlarged view illustrating the scraping action of the container serrations on a smooth cap thread when the pressures are of abnormal value;

Fig. 3a is an enlarged fragmentary view, partly in section, illustrating the cap shown in Fig. 2 applied to a container having a smooth thread.

Figure 1:
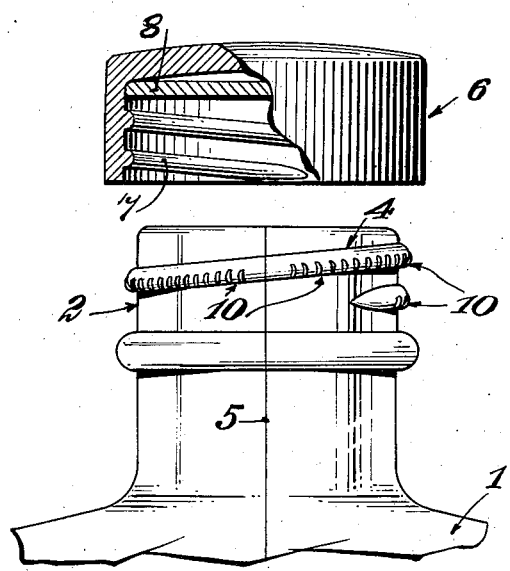
Fig. 1 is an exploded elevational view, partly in section, showing a molded closure cap having a smooth thread about to be applied to a container embodying the invention.

The proportions of the serrations on the container and on the closure cap, and also the action of the serrations on a plain cap thread, as illustrated in Figs. 1a and 1b, have of course been greatly exaggerated to bring out more clearly the details of applicant's invention.

Referring more particularly to the drawing, there is shown a glass container 1 having a neck portion 2 at the upper end thereof provided with threads 4 and having a mold parting line 5 thereon (Figs. 1, 3, 3a and 4).

In Fig. 1, a molded closure cap 6 having the customary smooth threads 7 on the interior of the skirt is shown just prior to being applied to the container 1. Preferably, the cap shown in Fig. 1, which is without serrations, is similar to that shown in Patent No. 2,039,757, granted May 5, 1936, to Louis A. Von Till, and any suitable liner 8 for sealing the rim of the container may be mounted therein. The container thread 4 has, on the underside thereof, a serrated part 10 which is discontinued for a short distance on each side of the mold parting line 5 to avoid possible interference therewith. These serrations are readily provided by forming corresponding recesses or projections on the mold for fabricating the containers. As the molded closure cap of Fig. 1 is turned downwardly upon a container having serrations 10 on the threads thereof, the serrations preferably have little or no effect upon the cap thread until the liner 8 is substantially forced against the rim of the container. The pressures then are greatly increased and become abnormal, in which case, the serrations begin to dig into the cap thread and cause an increased resistance to rotation in direct opposition to the applying force, whereupon the applying force may be released before the rupture point of the molded cap is reached. In Fig. 1a, the cap is shown being rotated in the direction indicated by the arrow with its smooth thread 7 mating with the container thread 4 and exerting normal pressure thereon. Under these conditions, the cap thread merely contacts the serrations and rides under the container thread without being materially affected by the serrations. Fig. 1b illustrates the action of the serrations 10 upon a smooth cap thread 7 when liner 8 is forced into sealing position and the pressures have become abnormal. The serrations on the glass container thread are shown biting into the surface of the cap thread to cause an increased resistance to rotation of the closure cap. There is present a scraping action, wherein the container serrations actually dig into the closure cap material or noticeably scratch the surface of the thread.

Figure 2:
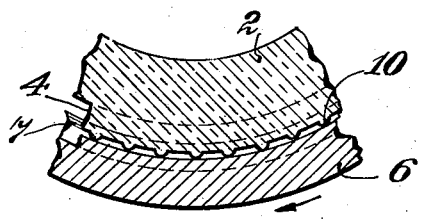
Fig. 2 is an elevational view, partly in section, showing a molded closure cap having serrations on the threads thereof.
Figure 2:
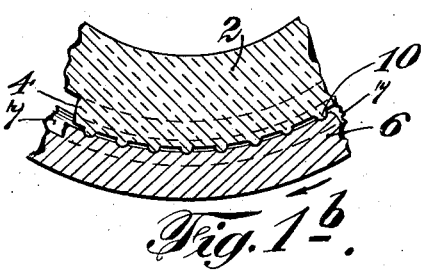
Figure 2:
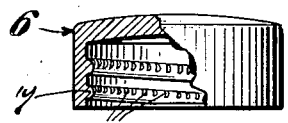
Figure 3:
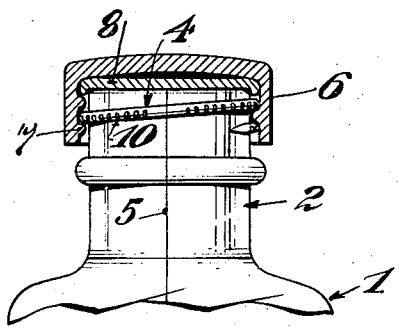
Fig. 3 is an elevational view, partly in section, showing a molded closure cap having serrations on the threads thereof applied to a container having serrations on the threads thereof.

It may be desired, in some cases, to provide a closure cap with serrations adapted to cooperate with the serrations on the container and Figs. 2 and 3 illustrate a molded closure cap having serrations 11. If the serrations on a container thread are placed on the lower surface thereof, the serrations on the cap threads should preferably be placed on the upper surface thereof so that the two series of serrations may act concurrently to prevent rupture of the molded cap in substantially the same manner as when serrations are provided on the container threads only. In this construction, the resistance to screwing the cap on becomes effective more quickly but the braking action can be controlled by the depth and size of the serrations. This cap can be readily made by stripping the caps from the hobs before the material has set or still is slightly plastic.

If desired, the serrations may be placed only upon the threads of the closure cap, the container thread being left smooth as illustrated in Fig. 3a. Slight fins occurring at the mold mark 5 will be engaged by the serrations of the cap and will tend to scrape or shear the serrations to cause a braking action. This will not prove as effective, however, as when the container is also provided with serrations.

Figure 4:
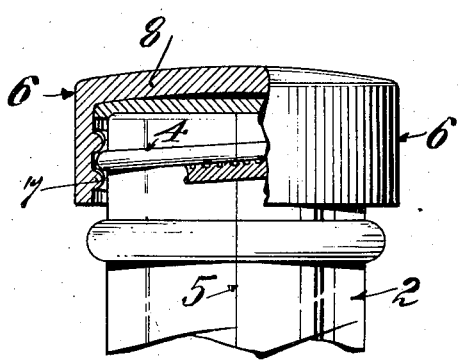
Fig. 4 is an elevational view of a container having surface irregularities on the neck thereof caused by frosting the finish.
Figure 4:
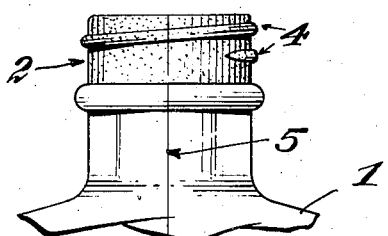

In place of serrations, the container neck may have a frosted or otherwise roughened surface as shown in Fig. 4. The frosting acts in substantially the same manner as the serrations referred to above, that is, under normal pressures the cap 6 is applied to a container in the same way as when no frosted or roughened surfaces are provided, without substantial increase in resistance to rotation, but when the pressures become abnormal there is an increased resistance to rotation in opposition to the applying force due to the roughened portions digging into the cap threads. This retarding effect causes the applying force to be released before the rupture point of the cap material is reached. In place of the serrations or frosting referred to herein, any other similar roughened or stippled surface may be provided to perform a like function.

Should the material of which the cap is composed possess a higher degree of elasticity or resilience than is ordinarily present in such molded caps, the action of the serrations of the container threads as the cap is rotated will be to cause the cap material adjacent a serration to become piled up or squeezed up immediately in front of the serration, thus impeding the rotation of the cap and providing a braking action. As the cap is rotated further, the cap material piled up immediately in front of a container serration will flow around the serration to the rear thereof. Succeeding serrations will have a like effect on the cap material. When serrations are provided on both the cap and container threads, the action will be substantially like that where the serrations are provided only on the container threads, except that the braking action will become effective more quickly and be much greater.

While the serrations or frosting have been shown discontinued on a screw thread at the mold parting line of a container for the purpose of avoiding any possible interference of the mold parting line with the serrations or frosting of the threads, it is to be understood that the serrations or frosting may be continued at this portion so as to have the serrations or frosting continuous all the way around the thread.

The serrations, frosting, or other roughened surfaces may be of a fine or coarse variety and may extend entirely or partially about the container, as desired, and need not be limited to being placed only on the lower surface of the threads of a container, and may be applied as well to containers other than those of glass.

It will be seen that an efficient means of eliminating breakage of molded closure caps and, at the same time, effecting a tight seal with no increase in the cost of the cap or container, has been provided. The hardness of "Bakelite" and other similar materials is such that the container serrations do not indent it to any material extent unless abnormal pressures are applied and then the increased resistance to rotation acts as a brake which is applied upon encountering excessive strains. Also, there is a tendency to deter any accidental backing off of the caps during shipment or handling, without increasing materially the force required to unscrew the caps, since the serrations become ineffective as soon as backward rotation is started.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The combination of a container and a closure cap molded from a plastic molding compound, an inclined thread on the closure cap, and an inclined thread on the container adapted to cooperate with the inclined thread on the closure cap to retain the cap thereon, one of said threads being provided with roughened portions on its engaging surface and the other of said threads having a smooth surface for engaging said roughened portions, said roughened portions contacting the smooth surface of the other thread simultaneously over a substantial part of the length thereof and being adapted to cleave to the smooth surface to cause the cooperating thread to increase resistance of the cap to rotation to a substantially greater extent than would be occasioned by the normal friction coefficient, thereby to prevent the cap from being applied so tightly that it is likely to be broken.

2. The combination of a container and a closure cap molded from a plastic molding compound, an inclined helical thread extending continuously about the interior of the closure cap, and an inclined helical thread extending continuously about the container and adapted to cooperate with the thread on the closure cap to retain the cap thereon, one of said threads being provided with roughened portions on its engaging surface and the other of said threads having a smooth surface for engaging said roughened portions, said roughened portions contacting the smooth surface of the other thread simultaneously over a substantial part of the length thereof and being adapted to cleave to the smooth surface to cause the cooperating thread to increase the resistance of the cap to rotation to a substantially greater extent than would be occasioned by the normal friction coefficient thereby to prevent the cap from being applied so tightly that it is likely to be broken.

3. The combination of a container and a closure cap molded from a plastic molding compound, an inclined helical thread extending continuously about the interior of the closure cap, and an inclined helical thread extending continuously about the container and adapted to cooperate with the thread on the closure cap to retain the cap thereon, said container thread being provided with roughened portions on its engaging surface and said cap thread having a smooth surface for engaging said roughened portions, said roughened portions on the container thread contacting the smooth surface of the cap thread simultaneously over a substantial part of the length thereof and being adapted to cleave to the smooth surface to cause the cooperating thread to increase the resistance of the cap to rotation to a substantially greater extent than would be occasioned by the normal friction coefficient thereby to prevent the cap from being applied so tightly that it is likely to be broken.

4. The combination of a container and a closure cap molded from a plastic molding compound, an inclined helical thread extending continuously about the interior of the closure cap, and an inclined helical thread extending continuously about the container and adapted to cooperate with the thread on the closure cap to retain the cap thereon, said cap thread being provided with roughened portions on its engaging surface and the cooperating container thread having a smooth surface for engaging said roughened portions, said roughened portions on the cap thread contacting the smooth surface of the container thread simultaneously over a substantial part of the length thereof and being adapted to engage the smooth surface to substantially increase the resistance of the cap to rotation to provide a braking action and to prevent the cap from being applied so tightly that it is likely to be broken.

5. As an article of manufacture, a closure cap molded from a plastic molding compound having a cover portion and a depending skirt, an inclined helical thread extending continuously about the interior of the skirt of the cap to cooperate with a similarly inclined helical thread on a container, said cap thread being provided with roughened portions on its engaging surface for contacting the surface of the container thread simultaneously over a substantial part of the length thereof and being adapted to engage the surface of the container thread to substantially increase the resistance of the cap to rotation to provide a braking action and to prevent the cap from being applied so tightly it is likely to be broken.

BANKS D. BROWN.